Nov. 10, 1953  A. Y. DODGE  2,658,405
SELECTIVE GEAR TRANSMISSION
Filed Dec. 29, 1950
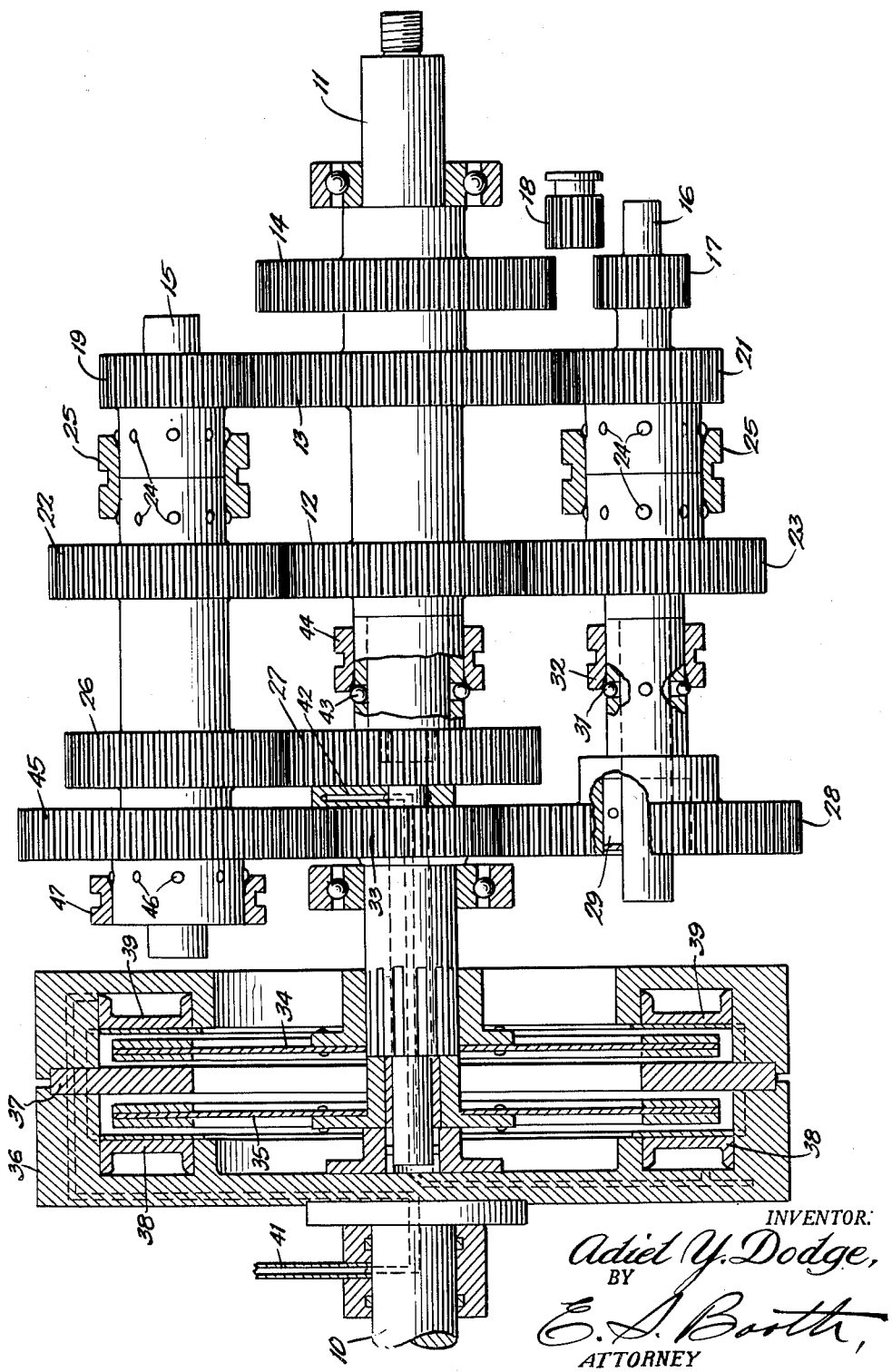
INVENTOR.
Adiel Y. Dodge,
BY
E. S. Barth
ATTORNEY Patented Nov. 10, 1953

2,658,405

UNITED STATES PATENT OFFICE 2,658,405

SELECTIVE GEAR TRANSMISSION

Adiel Y. Dodge, Rockford, Ill.

Application December 29, 1950, Serial No. 203,386

10 Claims. (Cl. 74—331)

This invention relates to selective gear transmissions, and more particularly to a transmission of the type adapted for use in automotive vehicles such as buses, trucks, and the like.

In selective gear transmissions of the type commonly used in automotive vehicles it is necessary to disengage the clutch and synchronize the several revolving parts which are to be effective in the new driving ratio before the shift can be completed. In heavy vehicles a substantial time interval is required to effect synchronization due to the inertia involved. This frequently makes it impossible to accomplish a shift in ascending hills, even though the transmission is not in the optimum ratio. For example in ascending a grade with the vehicle in too low a ratio the vehicle speed may drop sufficiently during an attempt to shift into a higher ratio to require falling back into the lower ratio. It is therefore very desirable to be able to effect the shift with a minimum or no torque interruption.

It is one of the objects of the present invention to provide a transmission which can be shifted through at least the majority of its available torque ratios quickly and easily and with a minimum of torque interruption.

According to one feature of the invention, the transmission is provided with two input gears, each of which can be selectively connected to the driven shaft through a plurality of gear sets of different torque ratios and which can be made effective selectively or simultaneously. In the preferred construction one of the ratios through one of the input gears is equal to a ratio through the other gear, so that both input gears can be made effective simultaneously.

According to another feature, one of the input gears drives through a one-way clutch which can overrun during an upward shift so that there will be no torque interruption. The one-way clutch can preferably be locked out when desired to prevent free wheeling.

According to still another feature, one of the input gears is utilized as a part of a reducing gear train to drive the driven shaft through the driving gear which normally drives the input gear. This construction provides a compact arrangement enabling a shift into direct drive with no torque interruption.

The above and other objects and features of the invention will be more readily apparent from the following description when read in connection with the accompanying drawing, in which the single figure is a sectional view with parts in elevation of a transmission embodying the invention.

The transmission as shown is adapted to connect a driving shaft 10, which may be an engine crankshaft or an extension thereof, to a driven shaft 11, which may be connected through the usual differential mechanism to the vehicle wheels. The driven shaft 11 has rigidly mounted thereon three gears, 12, 13 and 14, it being understood that this number is selected for illustration only and that a greater number of gears might be employed where a greater number of ratio changes is desired.

A pair of countershafts or layshafts 15 and 16 are mounted parallel to and equally spaced from the driven shaft 11 and carry gears meshing with the driven shaft gears. The gear 14 is for reverse and is adapted to be connected to a gear 17 rigidly mounted on the layshaft 16 through a shiftable idler pinion 18. During normal forward drive the pinion 18 is out of mesh with the gears 14 and 17 and is shifted into mesh therewith only when reverse drive is desired.

The gear 13 meshes with a gear 19 rotatable on the shaft 15, and also with a gear 21 rotatable on the shaft 16. Similarly, the gear 12 meshes with gears 22 and 23 rotatable on the shafts 15 and 16, respectively.

The gears 19—23 are adapted to be connected to their respective shafts through positive clutches which are preferably so constructed that they may be engaged or released under load. These clutches may take the form shown in my Patent No. 2,498,399 or my co-pending application Serial No. 213,141, filed February 23, 1951. Although the clutches are shown in the form covered in my patent for purposes of simplifying the diagrammatic disclosure and although such clutches will function satisfactorily, clutches as disclosed and claimed in my copending application are preferable since they provide much greater surface contact thereby providing longer life. As shown, each of the gears is provided with a tubular hub fitting slidably over its corresponding shaft and formed with a series of openings therethrough to receive balls 24. A cam collar 25 is slidable over the hubs and is formed on its ends with tapered cam surfaces so that when it is shifted toward one of the gears it will cam the balls 24 inward to engage registering recesses in the shaft. When the collar is moved away from the gear the poles will move outward to release the gear from its shaft.

The countershaft 15 is driven by an input gear 26 which is rigidly secured to the countershaft and which meshes with a driving gear 27. The countershaft 16 is similarly driven by an input gear 28, which is coupled to the countershaft through a one-way clutch 29. The clutch 29 is set to connect the gear 28 to the countershaft when the gear tends to drive the shaft in its normal forward direction and to release when the shaft tends to overrun the gear. The gear 28 may be rigidly connected to the countershaft 16 by a clutch mechanism, including balls 31 and a slidable cam collar 32 to prevent overrunning when desired. The gear 28 meshes with a driving gear 33 which is co-axial with the gear 27.

The driving gears 27 and 33 are adapted to be connected to the driving shaft 10 by means of friction clutches 34 and 35. As shown, the driving shaft 10 is connected to a clutch housing 36 having a central web 37 which the clutch plates 34 and 35 may engage. The plates are pressed against the web by annular pistons 38 and 39 slidable in the housing and respectively supplied with operating fluid through inlet passages 41 and 42. The control is such that the clutches can be engaged selectively or simultaneously either through manual controls or through a suitable automatic control mechanism.

For direct drive the driving gear 27 is adapted to be connected directly to the driven shaft 11 through a clutch mechanism including balls 43 and a slidable clutch collar 44. In addition the driving gear 27 may function as the driven gear of a reduction gear set for certain driving conditions. For this purpose an additional or supplemental input gear 45 is rotatably mounted on the shaft 15 and meshes with the driving gear 33. The gear 45 may be connected to the shaft 15 when desired through a clutch including balls 46 and shiftable cam collar 47.

For normal forward operation the vehicle is started in the highest torque ratio or lowest speed ratio, which is through the driving gear 33, input gear 28, gear 21 and driven gear 13. For this ratio the collar 25 is shifted to the right to connect gear 21 to shaft 16, and the friction clutch 34 is engaged to connect with driving gear 33 to the driving shaft 10. Due to the relative gear sizes, as shown, the driven shaft will be driven in the same direction as, and at a lower speed than, the driving shaft. To shift into the next higher speed ratio the upper collar 25 is shifted to the right and the clutch 35 is engaged. At this time the drive is through the driving gear 27, input gear 26, gear 19, and driven gear 13. The gear sizes are such that this will provide a higher speed ratio than the low speed described above. Due to the one-way clutch 29 this shift can be made without disengaging the clutch 34, although, if desired, the one-way clutch may be omitted and the clutch 34 disengaged simultaneously with engagement of the clutch 35. In any event there will be no torque interruption so that the change can be accomplished rapidly under adverse conditions.

After the shift into second, as described above, has been accomplished the lower collar 25 is shifted to the left to connect the gear 23 to the shaft 16, and the clutch 34 may be re-engaged. In the preferred construction the ratio through the driving gear 33, input gear 28, gear 23, and driven gear 12 is the same as the ratio provided by driving gear 27, gear 26, gear 19, and driven gear 13, so that both of these driving connections can be effected simultaneously. In one construction the gear 13 may have 39 teeth and the gears 19 and 21 may have 26 teeth, while the driving gear 33 has 20 teeth, the input gear 28 has 45 teeth, the driving gear 27 has 26 teeth, and the input gear 26 has 39 teeth. This construction will provide a ratio between the shafts 10 and 11 of 3.37-1 in low range and 2.25-1 in the second range just described. For second range through the countershaft 16, the gears 22, 12, and 23 all have 33 teeth, so that the second ratio will be 2.25-1.

To shift into the third speed ratio the upper collar 25 is shifted to the left to connect the gear 22 to the shaft 15 and the clutch 35 is engaged. This will produce a drive from the driving gear 27, input gear 26, gear 22, and gear 12 providing a ratio of 1.5-1. This same ratio of 1.5-1 may be produced by driving through the driving gear 33 to the additional input gear 45 to the gear 26 and back to the driving gear 27 directly to the driven shaft. To achieve this connection the collar 44 is shifted to the left to connect the driving gear 27 directly to the driven shaft, the collar 47 is shifted to the right to connect the gear 45 to the shaft 15, the clutch 35 is disengaged and the clutch 34 is engaged. This change can be accomplished very quickly with a minimum of torque interruption since the parts are all turning at proper synchronous speed and no change in driving ratio is effected.

For direct mechanical drive the clutch 35 is engaged and clutch 34 is disengaged, while maintaining the driving gear 27 connected to the driven shaft. At this time, the drive is direct through the clutch 35 and clutch 43, 44 between the driving and driven shafts.

It will be seen that with the present transmission changes in ratio can be accomplished rapidly and easily with a minimum strain on the parts and with a minimum of torque interruption. All upward changes in speed ratio are effected through friction clutches so that synchronization of toothed parts is forced by the friction clutches and the changes can be accomplished smoothly and easily. Downward shifts can be accomplished by reversing the procedure as described, although in downward shifting the problem is much simpler and certain of the steps can be omitted if desired.

While one embodiment of the invention has been shown and described in detail, it will be understood that this is illustrative only and is not intended to be a definition of the scope of the invention, reference being had for this purpose to the appended claims.

What is claimed is:

1. A transmission for connecting a driving shaft to a driven shaft comprising a pair of countershafts parallel to and spaced from the driven shaft, a plurality of pairs of gears on the driven shaft and the countershafts providing different gear ratios, means for selectively making the pairs of gears effective to drive the driven shaft, an input gear connectable to each of the countershafts, said input gears being of different sizes, coaxial driving gears meshing with the input gears respectively, an additional input gear rotatable on the countershaft to which the smaller input gear is connected and meshing with the driving gear which meshes with the larger input gear, a clutch for connecting the additional input gear to the shaft on which it is mounted, and clutches for selectively connecting the driving gears to the driving shaft.

2. A transmission for connecting a driving shaft to a driven shaft comprising a pair of countershafts parallel to and spaced from the driven shaft, a plurality of pairs of gears on the driven shaft and the countershafts providing different gear ratios, means for selectively making the pairs of gears effective to drive the driven shaft, an input gear connectable to each of the countershafts, said input gears being of different sizes, coaxial driving gears meshing with the input gears respectively, an additional input gear rotatable on the countershaft to which the smaller input gear is connected and meshing with the driving gear which meshes with the larger input gear, a clutch for connecting the additional input gear to the shaft on which it is mounted, a clutch for connecting the larger driving gear to the driven shaft, and clutches for selectively connecting the driving gears to the driving shaft.

3. A transmission for connecting a driving shaft to a driven shaft comprising a pair of countershafts parallel to and spaced from the driven shaft, a plurality of pairs of gears on the driven shaft and the countershafts providing different gear ratios, means for selectively making the pairs of gears effective to drive the driven shaft, an input gear fixed to one of the countershafts, a larger input gear rotatable on the other countershaft, a one way clutch to connect the larger input gear to its associated countershaft, coaxial driving gears meshing with the input gears respectively, and clutches for selectively connecting the driving gears to the driving shaft.

4. The construction of claim 3 including a positive clutch operable at will to connect the larger input gear to its associated countershaft.

5. A transmission for connecting a driving shaft to a driven shaft comprising a pair of countershafts parallel to and spaced from the driven shaft, a plurality of pairs of gears on the driven shaft and the countershafts providing different gear ratios, means for selectively making the pairs of gears effective to drive the driven shaft, an input gear fixed to one of the countershafts, a larger input gear rotatable on the other countershaft, a one way clutch to connect the larger input gear to its associated countershaft, coaxial driving gears meshing with the input gears respectively, an additional input gear rotatably mounted on said one of the countershafts and meshing with the smaller driving gear, a clutch for connecting the additional input gear to its associated countershaft, and clutches for selectively connecting the driving gears to the driving shaft.

6. The construction of claim 3 in which one of the pairs of gears associated with one countershaft provides the same ratio between the driving and driven shafts as one of the pairs of gears associated with the other countershaft.

7. A transmission for connecting a driving shaft to a driven shaft comprising a plurality of gears connected to the driven shaft, a pair of countershafts parallel to and spaced from the driven shaft, pinions rotatable on the countershafts and meshing with the gears, clutches for selectively connecting the pinions to the countershafts on which they are rotatable, an input gear fixed to one of the countershafts, a larger input gear rotatable on the other countershaft, a one-way clutch to connect the larger input gear to said other countershaft when the gear tends to drive the countershaft in its normal forward direction, coaxial driving gears meshing with the input gears, and clutches for selectively connecting the driving gears to the driving shaft.

8. A transmission for connecting a driving shaft to a driven shaft comprising a plurality of gears connected to the driven shaft, a pair of countershafts parallel to and spaced from the driven shaft, pinions rotatable on the countershafts and meshing with the gears, clutches for selectively connecting the pinions to the countershafts on which they are rotatable, a pair of input gears of different sizes drivably mounted on the countershafts respectively, a pair of coaxial driving gears of different sizes meshing with the input gears respectively, an additional input gear rotatable on the countershaft carrying the smaller input gear and meshing with the smaller driving gear, a clutch to connect the additional input gear to its associated countershaft, and clutches for selectively connecting the driving gears to the driving shaft.

9. A transmission for connecting a driving shaft to a driven shaft comprising a plurality of gears connected to the driven shaft, a pair of countershafts parallel to and spaced from the driven shaft, pinions rotatable on the countershafts and meshing with the gears, clutches for selectively connecting the pinions to the countershafts on which they are rotatable, a pair of input gears of different sizes drivably mounted on the countershafts respectively, a pair of coaxial driving gears of different sizes meshing with the input gears respectively, an additional input gear rotatable on the countershaft carrying the smaller input gear and meshing with the smaller driving gear, a clutch to connect the additional input gear to its associated countershaft, clutches for selectively connecting the driving gears to the driving shaft, and a clutch to connect one of the input gears to the driven shaft.

10. A transmission for connecting a driving shaft to a driven shaft, comprising a low range friction clutch driving a sleeve, a high range friction clutch driving a shaft inside of the sleeve, driving pinions on the shaft and on the sleeve, two countershafts parallel with the driven shaft and spaced therefrom, driving gears on the countershafts, driven gears on the driven shaft meshing with the driving gears, positive clutches to connect and disconnect certain of the driving gears, relative to the shafts on which they are mounted, gear ratios effected by the size of the driving and driven gears being such that a lower gear ratio effected by the higher range friction clutch is substantially equal to the ratio of the drive effected by the next higher gear ratio driven by the low range friction clutch, thus to provide a synchronized condition to permit ready and easy shifting of the positive clutches from one ratio to another.

ADIEL Y. DODGE.

References Cited in the file of this patent
UNITED STATES PATENTS

| Number | Name | Date |
| --- | --- | --- |
| 1,477,274 | Kearby | Sept. 4, 1923 |
| 1,724,202 | Jacobs | Aug. 13, 1929 |
| 2,208,153 | Budlong | July 16, 1940 |
| 2,280,683 | Bedford | Apr. 21, 1942 |
| 2,500,308 | Campodonico | Mar. 14, 1950 |
| 2,543,412 | Kegresse | Feb. 27, 1951 |